Figure 1:
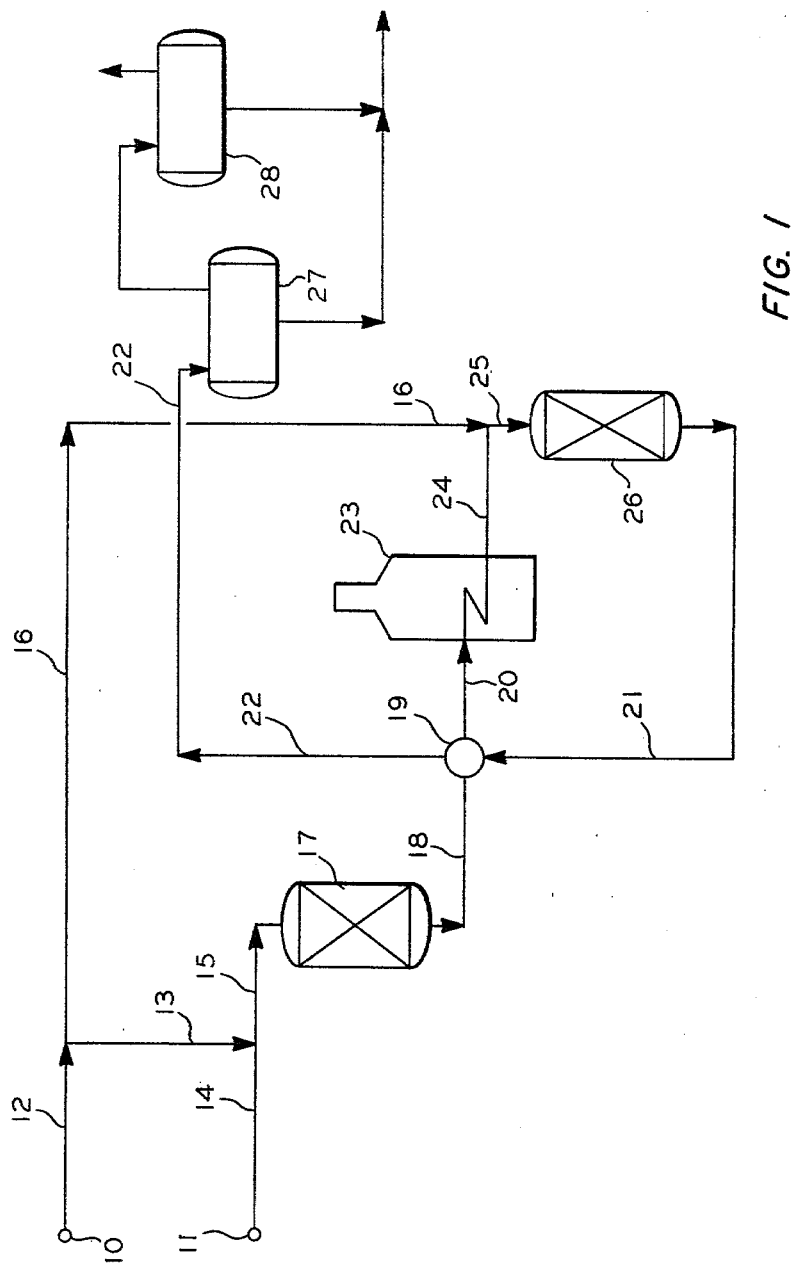

United States Patent [19]

Johnson et al.

[11] 4,344,841

[45] Aug. 17, 1982

[54] METHOD OF REMOVING CONTAMINANT FROM FEEDSTOCK STREAMS

[75] Inventors: Marvin M. Johnson; Gerhard P. Nowack, both of Bartlesville, Okla.

[73] Assignee: Phillips Petroleum Company, Bartlesville, Okla.

[21] Appl. No.: 80,604

[22] Filed: Oct. 1, 1979

[51] Int. Cl.$^3$ ............................................. B01D 15/00
[52] U.S. Cl. ................................ 208/211; 210/683; 210/684; 210/690
[58] Field of Search ............... 208/91, 179, 182, 211, 208/307, 302; 210/24, 39–41, 660, 683, 684, 690, 691

[56] References Cited

U.S. PATENT DOCUMENTS

| | | | |
|---|---|---|---|
| 2,107,904 | 2/1938 | Pool | 210/41 |
| 2,698,351 | 12/1954 | Hale | 210/41 |
| 2,704,770 | 3/1955 | Anspon | 210/41 |
| 2,744,053 | 5/1956 | Kay et al. | 208/211 |
| 2,762,852 | 9/1956 | Litton | 210/690 |
| 2,763,603 | 9/1956 | Skinner | 210/690 |
| 2,879,228 | 3/1959 | Holeton | 208/307 |
| 3,553,107 | 1/1971 | Donaldson et al. | 208/271 |
| 3,761,539 | 9/1973 | Drehman et al. | 260/683.3 |
| 3,925,193 | 12/1975 | Constantikes et al. | 208/91 |
| 4,176,047 | 11/1979 | Orrell et al. | 208/302 |

OTHER PUBLICATIONS

Filtrol Corporation Product Description sheets for: Filtrol Grade 71 and Filtrol Grade 24.
Philadelphia Quartz Industrial Chemicals Bulletin 90–1.
Davison Chemicals Silica Gel Properties Description Bulletin.
*Catalysis,* vol. 1, Part 1, Paul H. Emmett, Ed., (1954), pp. 260, 261, 264, 265, 270, 271.

*Primary Examiner*—Ivars C. Cintins

[57] ABSTRACT

Contaminants such as surfactants, antifoam agents, viscosifying agents, corrosion inhibitors, other agents used in tertiary recovery of enhanced oil recovery operations, and the like are removed from a contaminated feedstock stream by contacting said feedstock stream with an adsorbent selected from montmorillonite clays, amorphous silica, and mixtures thereof with one another and/or with bauxite. In a further aspect, the thus purified feedstock stream is hydrodesulfurized.

29 Claims, 1 Drawing Figure

METHOD OF REMOVING CONTAMINANT FROM FEEDSTOCK STREAMS

The invention relates to removing contaminants from feedstock streams. In one of its aspects, the invention relates to removing contaminants from a feed stream to a hydrodesulfurization process. In another of its aspects the invention relates to contacting hydrocarbons containing contaminants with an adsorbent selected from montmorillonite clays, amorphous silica such as silica gel, and combinations of such adsorbents with one another and/or with bauxite.

A problem encountered in processing a feedstock stream such as, for example, petroleum liquids received in a processing center, such as a refinery, from field production is the removal of materials which can foul equipment or otherwise interefere with subsequent handling and conversion steps such as catalytic conversions. Procedures to remove such materials as water, sediments, and entrained solids are well known.

Recently, however, the increased utilization of petroleum streams from enhanced oil recovery operations or tertiary recovery operations has given rise to additional problems of this nature resulting from the presence of chemicals used in such recovery procedures which persist in feedstock streams derived from the thus-recovered oil. As used herein, the term "feedstock stream contaminants" will be used to designate such materials which can come out of solution, for example, when the feedstock stream is heated and/or vaporized, thereby tending to deposit onto surfaces of processing equipment, for example, heat exchanger surfaces, and onto the surfaces of solid particles, for example, catalysts. The feedstock stream contaminants can include, for example, tertiary oil recovery or enhanced oil recovery chemicals, for example, surfactants, corrosion inhibitors, antifoam agents which are added to counteract the foaming tendency created by the surfactants and/or the corrosion inhibitors, viscosifying agents, and other agents used in tertiary recovery or enhanced oil recovery operations. However, the term "feedstock contaminants" as thus defined is not limited to such contaminants which have as their ultimate source the fact that the chemicals were added in the course of enhanced oil recovery operations. Rather, the term "feedstock contaminants" refers to such deposit forming contaminants in feedstock streams without regard to the manner in which the chemicals came to be present in the feedstock.

These chemicals can form deposits which cause fouling and plugging in heat exchange equipment and result in loss of catalytic activity in catalyst beds such as, for example, in fixed bed catalyst systems such as used in desulfurization, denitrification, isomerization, hydro-processes such as hydrodesulfurization and the like.

Further, while the invention is visualized to be particularly useful with petroleum containing feedstock streams, the term "feedstock stream" is intended to cover not only petroleum containing feedstock streams, but any feedstock stream containing such deposit forming contaminants which can be removed employing the present invention.

Accordingly, an object of this invention is the treatment of a contaminated feedstock stream to remove deposit forming contaminants. Another object of this invention is a method for treating a contaminated petroleum feedstock containing contaminants such as surfactants, corrosion inhibitors, antifoam agents, viscosifying agents, and other agents employed in enhanced oil recovery or tertiary oil recovery operations, to remove such contaminants. Another object is a method for treating, a contaminated feedstock stream serving as feedstock for a hydrodesulfurization process to remove contaminants therefrom. Yet another object is such a method for removing contaminants such as surfactants, corrosion inhibitors, antifoam agents, viscosifying agents, and other contaminants from petroleum feedstock streams derived from enhanced oil recovery or tertiary oil recovery processes. Yet other objects and advantages of this invention will be apparent to one skilled in the art from the following description and the drawing.

According to this invention, a contaminated feedstock stream containing feedstock contaminants as herein defined is contacted with an adsorbent selected from montmorillonite clays, amorphous silica, and mixtures of such adsorbents with one another and/or with bauxite to remove said contaminants therefrom to form a purified stream lean in such contaminants.

In a further aspect, such a purified feedstream lean in feedstock contaminants as herein defined is contacted with a hydrodesulfurization catalyst to produce a hydrodesulfurized feedstream for further processing as is known in the art.

FIG. 1 is a schematic representation of a preferred embodiment of the instant invention.

Referring now to FIG. 1 in detail, reference numeral 12 designates a reformer hydrogen stream having source 10, a portion of which is combined via stream 13 with a natural gas liquids (NGL) refinery stream 14 having source 11 comprising, for example, $C_5$ to $C_{10}$ hydrocarbons and passed with the NGL stream via a common stream 15 to a contacting bed 17 comprising an adsorbent in accordance with this invention. Stream 15 is contacted with an absorbent, as described below, in bed 17 to remove at least a portion of contaminants therefrom to produce a purified stream 18 which is passed to a heat exchanger 19. In heat exchanger 19, stream 18 is in heat exchange relationship with a heating stream 21, for example, hydrodesulfurized stream 21 from a hydrosulfurization reactor 26 whereby stream 18 gains heat to form a first heated purified NGL stream 20 and stream 21 is cooled to form a cooled hydrodesulfurized stream 22. Preferably stream 20 is heated as is known in the art to a temperature in the range of about 200° F. to about 500° F. Stream 20 is further heated in a furnace 23 if required to have a temperature in the range of about 400° F. to about 700° F., more preferably in the range of about 480° F. to about 650° F., since this is a normal range for hydrodesulfurization, so that a second heated purified NGL stream 24 is produced which is then combined with a portion of reformer hydrogen stream 16 and charged to a hydrodesulfurization (HDS) reactor 26 via common stream 25. In reactor 26, combined stream 25 is contacted with a suitable HDS (hydrodesulfurization) catalyst system, for example, a nickel molybdenum catalyst such as Nalco NM 502, available from Nalco Chemical Corp., Oakbrook, Ill. or the like to produce a hydrodesulfurized feedstock stream 21. Stream 21, as indicated above, is charged as a heating stream to economizer or heat exchanger 19 to produce a first cooled hydrodesulfurized stream 22. Stream 22 is then further processed as known in the art of petroleum refining such as in first and second flash tanks 27 and 28 respectively and further processed (not shown).

In accordance with our invention, feedstock contaminants or deposit forming contaminants including such contaminants as, for example, corrosion inhibitors, surfactants, antifoam agents, viscosifying agents, and other agents employed in tertiary recovery or enhanced oil recovery operations, and mixture thereof are removed by contacting a contaminant containing feedstream with an adsorbent in accordance with our invention.

The corrosion inhibitors which can be removed in accordance with our invention include inorganic corrosion inhibitors, for example, nitriles, chromates, silicates, phosphates, and the like, as well as organic corrosion inhibitors, for example, aldehydes, ketones, amines, thiols, sulfides, and the like.

The surfactants which can be removed in accordance with our invention can be: anionic surfactants, such as, for example, carboxylates, sulfonates, sulfates, phosphates, and the like; cationic surfactants, such as, for example, amines, quaternary ammonium compounds, and the like; non-ionic surfactants such as polyoxyethylenes, carboxylic esters, carboxylic amides, and the like; and amphoteric surfactants, such as, for example, ethoxylated alicyclic amines and the like.

The antifoam agents which can be removed in accordance with our invention can include silicones, such as, for example, silicone, dimethylsilicone, phenylpolysiloxane, and the like, as well as glycols, organic amines, phthalates, and the like.

The viscosifying agents which can be removed in accordance with our invention can include such as, for example, polysaccharides, polyacrylamides, cellulosic ethers, and the like.

Although the present invention is illustrated in a preferred embodiment in which the adsorbent bed is in the process stream of a hydrodesulfurization reactor, it is apparent that the invention is not limited thereto. Rather the invention is applicable to any system wherein deposit forming contaminants such as corrosion inhibitors, surfactants, antifoam agents, viscosifying agents, and other agents employed in tertiary recovery or enhanced oil recovery operations, can cause plugging or fouling of equipment or catalyst systems. Further the invention is not considered limited to fixed bed hydrodesulfurization catalysts. Rather, the invention is applicable to the treatment of all process streams wherein a hydrocarbon feedstream contaminated with such as, for example, the above-specified contaminants is to be converted by contacting with a catalyst system. Such catalyst systems can include any of the many fixed bed catalyst systems known in the art for hydrodesulfurization, of which nickel-molybdenum and cobalt-molybdenum catalysts are most effective, as well as fixed bed catalyst systems utilized in other processes such as desulfurization, dinitrification, isomerization, hydroprocessing, and the like.

The hydrodesulfurization catalysts which can be used in the instant invention include any catalyst effective to catalyze the hydrodesulfurization of a hydrocarbon feedstock stream. Specific hydrodesulfurization catalysts can include those which contain catalytically active metals selected from molybdenum, tungsten, nickel, cobalt, copper, iron, zinc, and mixtures thereof. These elements can be present in the metallic state or in the form of oxides, or carbonyls, or sulfides, or salts of carboxylic acids such as naphthenic acids, or chemically combined with each other, or chemically or physically combined with other metals such as the alkali or alkaline earth metals, particularly barium. Some examples of these are molybdenum oxide, cobalt molybdate, nickel sulfide, zinc molybdate, copper oxide, barium oxide, copper molybdate, magnesium tungstate, iron oxide, barium molybdate, tungsten oxide, zinc sulfide, molybdenum hexacarbonyl cobalt oxide, cobalt naphthenate, nickel naphthenate, barium naphthenate, and the like and mixtures thereof.

Such catalytically active materials can be associated, if desired, with catalytic support materials, preferably of the non-acidic type, such as alumina, calcium aluminate, barium aluminate, magnesium aluminate, bauxite, and the like and mixtures thereof. When such support materials are present, they can be present in any suitable amount, but generally the catalytic support materails can constitute from about 40 to about 95 weight percent of the total catalyst composite.

In some instances, the catalysts, either supported or unsupported, can be associated with an effective amount of alkali metals or alkaline earth metals to minimize or eliminate acid sites which would otherwise promote cracking side reactions. Alkali metals, for example, sodium, potassium, and the like can be used, for example, in the range of about 0.1% to about 1% by weight of the catalyst. Alkaline earths, for example, magnesium, calcium, barium, and the like, can be used, for example, in the range of about 1% to about 10% by weight of the catalyst.

Further, although the instant invention is illustrated in a preferred embodiment in which the feedstream purified comprises generally $C_5$ to $C_{10}$ hydrocarbons, i.e., the range normally utilized in motor fuels, any suitable contaminated feedstock stream from which it is desirable to remove such contaminants can be used, such as, for example, any fluid hydrocarbon stream such as a hydrocarbon oil stream.

According to the instant invention, the adsorbent is an adsorbent selected from montmorillonite clays, amorphous silica, such as silica gels, and mixtures of such adsorbents with one another and/or with bauxite. Although specific trademarked products are described below and in the Examples, the invention is not limited thereto but includes any preparation of such adsorbents and mixtures thereof effective for adsorption of contaminants such as surfactants, corrosion inhibitors, antifoam agents, viscosifying agents, and other agents utilized in tertiary recovery and enhanced oil recovery operations.

When bauxite is used in a mixture in accordance with the instant invention, the bauxite can be any bauxite effective to adsorb feedstock contaminants such as surfactants, corrosion inhibitors, antifoam agents, viscosifying agents, other agents used in tertiary recovery or enhanced oil recovery operations, and the like. For example, the bauxite can be any bauxite comprising in the range of about 30 to about 75 percent $Al_2O_3$, in the range of about 2 to about 31 percent $H_2O$, in the range of about 3 to about 25 percent $Fe_2O_3$, in the range of about 2 to about 9 percent $SiO_2$, and in the range of about 1 to about 3 percent $TiO_2$. The bauxite can be, for example, a commercial activated bauxite such as Porocel bauxite, available from Minerals and Chemicals Division, Engelhard Minerals and Chemicals Corp., and having characteristics such as those set out in Table II in Example I below.

In accordance with one aspect of our invention an acid activated montmorillonite clay can be used. The acid activated montmorillonite clay can be any such clay effective to remove contaminants such as surfactants, corrosion inhibitors, antifoam agents, viscosifying agents, other agents used in tertiary recovery or enhanced oil recovery operations, and the like. For example, the acid activated montmorillonite clay can be an acid activated clay having the following approximate composition: $Al_2O_3.4\ SiO_2.H_2O$. The acid activated clay can be a commerically available acid activated montmorillonite clay such as Filtrol 24 and Filtrol 71, available from Filtrol Corp., Los Angeles, Calif. 90045, and having characteristics such as those set out in Table III in Example I below.

As suggested below in Example I, it is believed that any acid activated montmorillonite clay will work in accordance with the instant invention. However, it is currently more preferred to use the relatively less acidic acid activated clays. Accordingly, an acid activated montmorillonite clay having an acidity equivalent in the range of about zero to about 25 mg KOH/g is preferred, and more preferably such a clay having an acidity equivalent in the range of about zero to about 10 mg KOH/g.

In accordance with another aspect of the instant invention a regenerative adsorbent comprising amorphous silica can be used to remove contaminants from a feedstock stream. The amorphous silica can be, for example, a substantially dehydrated, polymerized silica. The amorphous silica can be, for example, silica gel or other forms of amorphous silica effective to remove deposit forming contaminants from a feedstock stream. The silica gel can be, for example, a regular density silica gel, an intermediate density silica gel, or a low density silica gel such as are known in the art. Preferably the silica gel can have an apparent or bulk density in the range of about 0.10 to about 0.80, more preferably in the range from about 0.30 to about 0.80, and most preferably in the range of about 0.50 to about 0.80 since this range includes materials shown to be particularly effective for adsorption as shown in Example I below. Preferably the silica gel can have a surface area in square meters surface area per gram of silica gel in the range of about 100 to about 1000, more preferably in the range of about 300 to about 1000 and most preferably in the range of about 700 to about 1000 since generally adsorption increases with an increase in surface area and this range includes materials which have been found to be particularly effective as shown in Example I below.

The silica gel can be, for example, a commercially available intermediate density silica gel such as Davison R59 silica gel having characteristics such as those set out in Table IV in Example I below.

The silica gel can also be, for example, a commercially available regular density activated silica gel having a high surface area and low pore volume such as Sol-Gel 300 and the like having the characteristics such as those in Table V in Example I below.

Silica gel as is known has a high affinity for water. The presence of water can cause swelling and attrition in the silica gel adsorbent leading to premature pressure drop problems as indicated in Example III below. Accordingly, when silica gel is used as the adsorbent in accordance with the instant invention, it is preferred that the contaminated hydrocarbon feedstock stream be free of any separate water phase and preferably contain no more than about 200 ppm water.

As indicated, in accordance with one aspect of our invention combinations of adsorbents can be used. When a combination of adsorbents is employed, the adsorbent bed is generally prepared by layering one adsorbent above another. However, mixtures of adsorbents wherein one adsorbent is interspersed with another and/or sequential contacting of the feedstream with different adsorption beds comprising different adsorbents can also be effectively employed.

A currently most preferred combination comprises a regular density silica gel and bauxite. Bauxite has the advantage of relatively low cost and good exchange capacity. A regular density silica gel has the advantage of high exchange capacity and effectiveness as shown in Example I below. The bauxite and the regular density silica gel can be combined in any suitable proportion to achieve those advantages in a particular application. Preferably the silica gel can be in the range of about 5 to about 75 percent by weight of the total adsorbent weight, and more preferably in the range of about 10 to about 25 percent by weight.

Generally, the temperature at which a contaminant containing stream is contacted with the adsorbent in the adsorbent bed is not considered critical and almost any temperature can be used. In practice, however, the temperature at which the bed is operated can be related to the requirements of the overall process of which the contaminant removal according to the instant invention is a part. Pressure is subject to similar considerations and most any pressure effective for the overall process of which the contaminant removal is a part can be utilized.

The heating temperature can be in the range of ambient to about 600° F. (320° C.), more preferably in the range of about 150° F. to about 350° F. (about 65° C. to about 177° C.) since this is a useful preheating range for many hydroprocesses.

The pressure at which a contaminant containing stream will be contacted with the adsorbent in the adsorbent bed is preferably sufficient to insure that the stream will be in liquid phase or have a minimum amount in vapor phase at the time of contacting the fixed bed adsorbent to insure good contacting. Thus for a NGL stream such as is used in hydrodesulfurization according to a preferred embodiment of the instant invention, the pressure will generally be below about 700 psia (pounds per square inch absolute).

Weight hourly space velocity (WHSV), i.e., pounds feedstock per pound absorbent per hour can be in the range of about 0.2 to about 20 with a preferred range being from about 1 to about 5 WHSV since this is a useful range for many hydroprocesses.

To further illustrate the present invention, the following Examples are provided.

EXAMPLE I

A series of adsorption runs was made in small laboratory adsorption beds. A natural gas liquids feed containing about 200 ppm (parts per million) of Dow Corning 2000 silicone antifoaming agent in n-heptane was charged to adsorbent beds containing the adsorbent specified in Table I below. Absorbents tested include: MgO (magnesia or magnesium oxide); attapulgite clay in the form of Millwhite Clay having the characteristics set out below in Table II; montmorillonite clay in the form of a relatively higher acidity clay such as Filtrol 24 and in the form of a relatively lower acidity clay such as Filtrol 71, the montmorillonite clays having the characteristics set out in Table III below; bauxite in the form of Porocel bauxite, having the characteristics set out in Table IV below; and amorphous silicon dioxide in the form of an intermediate density silica gel such as Davison 59 SiO₂ having characteristics set out in Table V below as well as in the form of a regular density silica gel such as Sol-Gel 300 having the characteristics set out in Table VI below. Operation of the adsorbent bed was at 200° F. (93° C.), liquid phase, at a WHSV (weight hourly space velocity) of 1. The concentration of silicone in the effluent was determined by an induction coupled plasma spectrometer. Results are presented in Table I below.

Materials employed in these runs are available as follows: Dow Corning 2000 silicone antifoaming agents from Dow Corning Corp., Midland, Mich.; MgO magnesia from Alfa Div., Ventron Corp., Danvers, Maine; Filtrol 24 and Filtrol 71 montmorillonite clays, from Filtrol Corp., Los Angeles, Calif.; Davison 59 $SiO_2$ from Davison Chemical Div., W. R. Grace and Co., Baltimore, Md.; Porocel Bauxite from Porocel Corp., Menlo Park, N.J.; and Sol-Gel 300 from Sol-Gel Corp., Pritchard, Ala.

TABLE I

| Concentration of Silicone in Effluent (ppm) | On Stream Time (Days) | | | | | |
|---|---|---|---|---|---|---|
| | MgO | Millwhite Clay | Filtrol 24 | Filtrol 71 | Davison 59 $SiO_2$ | Porocel Bauxite | Sol-Gel 300 $SiO_2$ |
| 0 | 0 | 0 | 0 | 3.0 | 3.0 | 3.0 | |
| 20 | 0.08 | 0.08 | 2.0 | 3.6 | 3.8 | 3.4 | 13.2 |
| 100 | 0.5 | 0.5 | 6.2 | 4.7 | 5.7 | 4.25 | 13.6 |

TABLE II (Millwhite Clay attapulgite)

| Chemical Composition | |
|---|---|
| $SiO_2$ | 67%[a] |
| $Al_2O_3$ | 13% |
| $Fe_2O_3$ | 4% |
| MgO | 11% |
| CaO | 2% |
| $K_2O$ | 0.6% |
| $Na_2O$ | 0.3% |
| $TiO_2$ | 0.6% |
| Physical Properties | |
| Loss on Ignition | 20% |
| Apparent Density | 0.5 g/ml |
| Pore Volume | 0.6 ml/g |
| Surface Area | 120 m²/g |

[a]All percentage figures in Table II through Table VI are given as weight percents on a dry weight basis.

TABLE III

| (Montmorillonite Clays)[a] | | |
|---|---|---|
| | Filtrol 24 | Filtrol 71 |
| Particle Size Analysis by Tyler Standard Sieve | | |
| Through 16 mesh | — | 100% |
| Through 20 mesh | 100% | — |
| Through 30 mesh | — | 98% |
| Through 60 mesh | 5% | 35% |
| Through 200 mesh | — | 1% |
| Free Moisture | 10% | 15% |
| Free and Combined Moisture (Loss at 1700° F.) | 15 (max.) % | 21 (max.) % |
| Apparent Density | 47 lbs/cu ft | 45.0 lbs/cu ft |
| Particle Density | 1.3 | 1.3 |
| Surface Area, $N_2$ Adsorption (Brunauer, Emett, and Teller Method) | 280–300 m²/g | 270–290 m²/g |
| Acidity (determined by titrating with KOH to phenophthalein end point) | 12–20 mg KOH/g | 8.0 mg KOH/g |

TABLE III-continued

| (Montmorillonite Clays)[a] | | |
|---|---|---|
| | Filtrol 24 | Filtrol 71 |
| pH | — | 3.0 | a. A dash indicates the information was not available.

TABLE IV

| (Porocel bauxite) | |
|---|---|
| Chemical Analysis | |
| Silica, as Silicon dioxide | 15% |
| Aluminum, as $Al_2O_3$ | 80% |
| Iron, as $Fe_2O_3$ | 4% |
| Titanium, as $TiO_2$ | 1.0% |
| Physical Properties | |
| Loss on Ignition | 12% |
| Apparent Density | 6.8 g/ml |
| Pore Volume | 0.26 ml/g |
| Surface Area | 140 m²/gram |

TABLE V

| (Davison 59 $SiO_2$) | |
|---|---|
| Chemical Analysis | |
| Silica, as $SiO_2$ | >99% |
| Physical Properties | |
| Total Volatile (% at 1750° F.) | 3.5 |
| Apparent density | 25.0 lbs/ft³ (400 kg/meter³) |
| Surface Area | 340 m²/gram |
| Particle Size | 1.15 cc/gram |
| Average Pore Diameter | 47 Angstrom units |
| Particle Size (Tyler Sieve) | 3–8 mesh |

TABLE VI

| (Sol-Gel 300) | |
|---|---|
| Chemical Analysis | |
| Silica, as $SiO_2$ | 99.6% minimum |
| Aluminum, as $Al_2O_3$ | 0.15% maximum |
| Sodium, as $Na_2O$ | 0.10% maximum |
| Iron, as $Fe_2O_3$ | 0.05% maximum |
| Calcium, as CaO | 0.05% maximum |
| Trace compounds | 0.05% |
| Physical Properties | |
| Ignition Loss at 960° C. | 6.5% maximum |
| Apparent Density | 37 lb/ft³ (592.7 kg/m³) minimum |
| Surface Area | 760 m²/gram |
| Particle Size (Tyler Sieve) | 8–20 mesh |

In Table I, the On Stream Time indicates the length of time in days required before the concentration of effluent from the bauxite bed exceeded the concentration of silicone indicated in Table I. To illustrate, for example, when bauxite was employed as adsorbent, the concentration of silicone in the effluent from the bauxite bed did not exceed 0 ppm for 3.0 days, did not exceed 20 ppm for 3.7 days and did not exceed 100 ppm for 5.7 days. In general and subject to the limitations discussed below, the larger the On Stream Time figure in days, the more effective the specified adsorbent functioned in the instant runs.

Consideration of the data in Table I shows that MgO and attapulgite clays such as Millwhite Clay were relatively ineffective as adsorbents for silicone oil under the conditions employed.

Acid montmorillonite clays, such as Filtrol 24 or Filtrol 71, were effective and can be used as adsorbents for silicone oils. However the acid montmorillonite clays have an apparent tendency to catalyze decomposition or depolymerization of the adsorbed chemicals, for example, the acid montmorillonite clays appear to break down the silicone oils into smaller molecules which can be redeposited on the HDS catalyst. In this respect, a more acid clay such as Filtrol 24 suffers from greater disadvantages than a less acid clay such as Filtrol 71. Thus, although the acid clays can be used, such clays while preferred are not presently most preferred.

As further indicated in Table I, an intermediate density silicon dioxide adsorbent such as Davison 59 $SiO_2$ is more effective than either of the acid montmorillonite clays tried and can be used effectively as an adsorbent for silicone oil. Further, the redepositing problem expected with the acid montmorillonite clays is not expected with a silicon dioxide adsorbent. However, compared to an adsorbent comprising bauxite an intermediate density silica gel such as Davison 59 $SiO_2$ is relatively more expensive. Compared to a regular density silica gel such as Sol-Gel 300, the intermediate density silica gel has a relatively poorer exchange capacity. For these reasons, an intermediate density silicon dioxide, although it can be used as an adsorbent and is a preferred compound over such compounds as the acid montmorillonite clays, is not currently most preferred.

As further indicated in Table I, a bauxite adsorbent is also effective for removing silicone from a contaminated stream. Although bauxite is slightly less effective than either of the relatively less acidic acid montmorillonite clays, such as Filtrol 71 or a silicon dioxide adsorbent such as Davison 59 $SiO_2$, it is currently a most preferred adsorbent when used in a combination with another adsorbent, preferably with a regular density silica gel such as, for example, Sol-Gel 300. Relative to the acid montmorillonite clays, bauxite is preferred because the bauxite adsorbent is not subject to breaking down the silicone oil which can be followed by redeposition on the catalyst. Rather, the bauxite bed appears either to retain the silicone oil or to pass it. Relative to the intermediate density silicon dioxide adsorbents such as Davison 59 $SiO_2$, bauxite has the advantage of relatively higher exchange capacity thereby requiring a relatively smaller amount of adsorbent and the further advantage of relatively less expensive costs. Relative to a regular density silica gel adsorbent such as Sol-Gel 300 $SiO_2$, bauxite, although relatively less effective than regular density silica gel adsorbents, has the advantage of greatly reduced costs.

A regular density silica gel adsorbent such as Sol Gel 300 $SiO_2$ also is a currently most preferred adsorbent because of its greatly increased effectiveness relative to other adsorbents.

EXAMPLE II

A refinery NGL stream, 22500 bbl/day and comprising $C_5$-$C_{10}$ hydrocarbons, was combined with a 0.5 MM CFD reformer hydrogen stream and passed through a 8' diameter×12' deep bed of 4-8 mesh Porocel bauxite (Porocel Corp., Menlo Park, N.J.) at 190° F. (88° C.) and 250 psig. The stream was not analyzed, but contained an estimated 10 ppm of silicone plus a similar amount of petroleum sulfonate. Treated NGL was then further heated by heat exchange and a process furnace to 480°-550° F. (249°-288° C.), combined with 5.3 MM CFD of reformer hydrogen and passed through a hydrodesulfurization reactor using Nalco NM 502, a nickel molybdenum catalyst. The unit operated for 84 days before excessive pressure (>50 psi) necessitated a shutdown to burn out exchanger and furnace tubes and change out catalyst. In previous similar operation without an adsorption bed, the unit could only be operated about 30-50 days between shutdowns for cleanup.

Example II indicates that bauxite alone is effective as an adsorbent for removing deposit forming contaminants such as petroleum sulfonate and silicone oil from a refinery NGL stream.

EXAMPLE III

A run utilizing 3-8 mesh (Tyler Standard Sieve) Sol-Gel 300 was made under essentially the same conditions of temperature, pressure, and flow rate employed in Example II. The run operated for 54 days before excessive pressure necessitated a shut down. Another run utilized an adsorbent bed comprising about 15% by weight Sol-Gel 300 and about 85% by weight bauxite. The adsorbent bed was layered with approximately 15% Sol-Gel 300 layered below (downflow) approximately 85% bauxite. The run continued 43 days before excessive pressure necessitated a shut down. These runs were followed by an all bauxite run which lasted 98 days.

The runs in which the adsorbent comprised silica gel alone or in combination with bauxite were terminated because of high pressure drop caused by a break up of the silica gel. Visual examination indicated that the break up of the silica gel was due to the high water content of the refinery NGL stream. Consequently, the feedstream is preferably free of any separate water phase and preferably contains less than about 200 ppm water, particularly when silica gel is used alone or in combination with another adsorbent.

As indicated in Example II, in previous similar operation without an adsorption bed, the unit could only be operated for about 30-50 days between shutdowns for cleanup. The failure of the instant runs comprising silica gel to substantially extend the length of the runs is considered not to reflect on the suitability, discussed in Example I above, of a silica gel such as, for example, Sol-Gel, but rather to show the desirability of low water content streams when an adsorbent comprising silica gel, alone or in combination with another adsorbent, is utilized. It is considered that utilization of an adsorbent bed comprising silica gel, alone or in combination with another adsorbent, for example, bauxite, can significantly extend the run time before shut down is required when a low water content feedstock stream, for example, a feedstock stream having less than about 200 ppm water, is utilized.

That which is claimed is:

1. A method for removing at least one contaminant selected from the group consisting of chromates, silicates, phosphates, aldehydes, thiols, sulfides, carboxylates, sulfonates, sulfates, polyoxyethylenes, carboxylic esters, silicone, dimethyl silicone, phenylpolysiloxane, glycols, phthalates, polysaccharides, and cellulosic ethers from a feedstock stream to a catalytic conversion process, the method comprising:

contacting the feedstock stream with an adsorbent comprising amorphous silica.

2. The method of claim 1 in which the amorphous silica is silica gel.

3. The method of claim 2 in which the silica gel is selected from the group consisting of regular density silica gels, intermediate density silica gels, and low density silica gels.

4. The method of claim 2 in which the silica gel has an apparent density in the range of about 0.30 to about 0.80 and a surface area in the range of about 300 to about 1000 square meters surface area per gram of silica gel.

5. The method of claim 2 in which the silica gel has an apparent density in the range of about 0.50 to about 0.80 and a surface area within the range of about 700 to about 1000 square meters per gram.

6. The method of claim 2 in which the adsorbent further comprises bauxite.

7. The method of claim 6 in which the silica gel has an apparent density in the range of about 0.50 to about 0.80 and a surface area in the range of about 700 to about 1000.

8. The method of claim 7 in which the silica gel is present in an amount in the range of about 5 to about 75 weight percent, based on the total adsorbent weight.

9. The method of claim 8 in which the contaminant comprises silicon oil and the contacting of the adsorbent with the feedstock stream is effected at a temperature in the range of about 150° F. to about 350° F., a pressure less than 700 psia, and a weight hourly space velocity of about 1 to about 5.

10. The method of claim 7 in which the silica gel is present in an amount in the range of about 10 to about 25 weight percent, based on the total adsorbent weight.

11. The method of claim 2 in which the feedstock stream comprises hydrocarbons having from 5 to 10 carbon atoms per molecule.

12. The method of claim 2 in which the contaminant comprises silicone oil.

13. The method of claim 12 in which the contacting is effected at a temperature of from about ambient to about 600° F.

14. The method of claim 12 in which the contacting is effected at a weight hourly space velocity of about 1 to about 5.

15. The method of claim 12 in which the contacting is effected at a pressure less than 700 psia.

16. A method of hydrodesulfurizing a petroleum feedstock stream comprising:
contacting a petroleum feedstock stream contaminated with at least one of the group consisting of chromates, silicates, phosphates, aldehydes, ketones, thiols, sulfides, carboxylates, sulfonates, sulfates, polyoxyethylenes, carboxylic esters, dimethylsilicone, phenylpolysiloxane, glycols, phthalates, polysaccharides, and cellulosic ethers, with an adsorbent comprising amorphous silica to produce a purified petroleum feedstock stream; and
subsequently contacting the purified petroleum feedstock stream with a hydrosulfurization catalyst under conditions effective for hydrodesulfurization to produce a hydrodesulfurized feedstock stream.

17. The method of claim 16 which the petroleum feedstock stream comprises hydrocarbons having from about 5 to about 10 carbon atoms per molecule.

18. The method of claim 17 in which the feedstock contaminant is silicone oil.

19. The method of claim 18 in which the amorphous silica is silica gel.

20. The method of claim 19 in which the silica gel has an apparent density in the range of about 0.10 to about 0.80 and a surface area in the range of about 100 to about 1000 square meters per gram.

21. The method of claim 20 in which the adsorbent further comprises bauxite.

22. The method of claim 21 in which the silica gel is present in an amount of from about 5 to about 75 weight percent, based on the weight of the adsorbent.

23. The method of claim 22 in which the contacting of the feedstock stream with the adsorbent is effected at a temperature of from about 150° to about 350° F., a pressure less than 700 psia, and a weight hourly space velocity of about 1 to about 5.

24. The method of claim 19 in which the silica gel has an apparent density of from about 0.30 to about 0.80 and a surface area from about 300 to about 1000 square meters per gram.

25. The method of claim 19 in which the silica gel has an apparent density of from about 0.50 to about 0.80 and a surface area of from about 700 to about 1000 square meters per gram.

26. A method of removing at least one contaminant selected from the group consisting of chromates, silicates, phosphates, aldehydes, thiols, sulfides, carboxylates, sulfonates, sulfates, polyoxyethylenes, carboxylic esters, silicone, dimethyl silicone, phenylpolysiloxane, glycols, phthalates, polysaccharides, and cellulosic ethers from a feedstock stream to a catalytic conversion process, the method comprising:
contacting the feedstock stream with an adsorbent comprising silica gel and an acid activated montmorillonite clay having an acidity equivalent of from about 0 to about 10 mg KOH/g.

27. The method of claim 26 in which the acid activated montmorillonite clay has the approximate composition $Al_2O_3.4SiO_2.H_2O$.

28. The method of claim 26 in which the adsorbent further comprises bauxite.

29. The method of claim 28 in which the bauxite comprises about 30 to about 75 percent $Al_2O_3$, about 2 to about 31 percent $H_2O$, about 3 to about 25 percent $Fe_2O_3$, about 2 to about 9 percent $SiO_2$, and about 1 to about 3 percent $TiO_2$.

* * * * *